United States Patent
Kim (10) Patent No.: US 12,474,117 B2
(45) Date of Patent: Nov. 18, 2025

(54) AUTOMATED SYSTEM FOR DRYING CONDITIONS OF ELECTRODES FOR SECONDARY BATTERY

(71) Applicant: LG Energy Solution, Ltd., Seoul (KR)

(72) Inventor: Sunhyung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 577 days.

(21) Appl. No.: 18/011,438

(22) PCT Filed: Apr. 8, 2022

(86) PCT No.: PCT/KR2022/005146
§ 371 (c)(1),
(2) Date: Dec. 19, 2022

(87) PCT Pub. No.: WO2022/225237
PCT Pub. Date: Oct. 27, 2022

(65) Prior Publication Data
US 2023/0243585 A1      Aug. 3, 2023

(30) Foreign Application Priority Data
Apr. 21, 2021      (KR) .......................... 10-2021-0051620

(51) Int. Cl.
*F26B 21/10*      (2006.01)
*F26B 15/12*      (2006.01)
(Continued)

(52) U.S. Cl.
CPC ............ *F26B 21/10* (2013.01); *F26B 15/122* (2013.01); *F26B 25/06* (2013.01); *H01M 10/0404* (2013.01)

(58) Field of Classification Search
CPC ........ F26B 21/10; F26B 15/122; F26B 25/06; F26B 17/023; F26B 21/06; F26B 3/04;
(Continued)

(56) References Cited

U.S. PATENT DOCUMENTS

2020/0083517 A1      3/2020   Kishimoto

FOREIGN PATENT DOCUMENTS

| JP | 2003178752 A | 6/2003 |
|----|--------------|--------|
| JP | 2007227831 A | 9/2007 |

(Continued)

OTHER PUBLICATIONS

Translation, KR-20190055726-A (Year: 2019).*
International Search Report for Application No. PCT/KR2022/005146 mailed Aug. 1, 2022, pp. 1-3.

Primary Examiner — Jessica Yuen
(74) Attorney, Agent, or Firm — Lerner David LLP (57) ABSTRACT

An automated system for drying conditions of electrodes for secondary battery includes
  a transfer unit for transferring a preliminary electrode in which an electrode active material slurry is coated onto a current collector,
  a drying unit arranged along the transfer direction and dry the preliminary electrode,
  a sensor for measuring the electrode temperature of the preliminary electrode in real time and transmitting information to a system control unit, and
  a system control unit for receiving information from the sensors and adjusting the drying conditions,
    wherein the adjustment of the drying conditions is to change the conditions when the information received from the sensor satisfies the condition 1 or 2:
    wherein condition 1 is a function of three different temperatures T1, T2, and T3,
    and Condition 2 is a function of
    α, the electrode temperature increase rate of the preliminary electrode, and β, the electrode temperature increase acceleration of the preliminary electrode.

10 Claims, 8 Drawing Sheets

(51) Int. Cl.
*F26B 25/06* (2006.01)
*H01M 10/04* (2006.01)

(58) Field of Classification Search
CPC ........... H01M 10/0404; H01M 4/0404; H01M 10/052; H01M 4/0471; Y02E 60/10
See application file for complete search history.

(56) References Cited

FOREIGN PATENT DOCUMENTS

| | | | | |
|---|---|---|---|---|
| JP | 2008103098 | A | 5/2008 | |
| JP | 2013084383 | A | 5/2013 | |
| JP | 2014032767 | A | 2/2014 | |
| JP | 2015032466 | A | 2/2015 | |
| JP | 6011478 | B2 | 10/2016 | |
| JP | 2020042991 | A | 3/2020 | |
| JP | 6808338 | B2 | 1/2021 | |
| KR | 20030047462 | A | 6/2003 | |
| KR | 20130076759 | A | 7/2013 | |
| KR | 20160047748 | A | 5/2016 | |
| KR | 20180125721 | A | 11/2018 | |
| KR | 20190029305 | A | 3/2019 | |
| KR | 20190055726 | A * | 5/2019 | .......... H01M 4/0435 |

* cited by examiner

AUTOMATED SYSTEM FOR DRYING CONDITIONS OF ELECTRODES FOR SECONDARY BATTERY

CROSS-REFERENCE TO RELATED APPLICATIONS

The present application is a national phase entry under 35 U.S.C. § 371 of the International Application No. PCT/KR2022/005146 filed on Apr. 8, 2022, which claims priority from Korean Patent Application No. 10-2021-0051620 filed on Apr. 21, 2021, the disclosures of which are incorporated herein by reference in their entireties.

FIELD OF THE INVENTION

The present disclosure relates to an automated system for drying conditions of electrodes for secondary battery.

BACKGROUND OF THE INVENTION

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

In recent years, as mobile devices, such as portable computers, portable phones, and cameras, have been increasingly developed, the demand for secondary batteries has also sharply increased as an energy source for the mobile devices. Among such secondary batteries is a lithium secondary battery exhibiting high charge/discharge characteristics and lifetime characteristics and being environmentally friendly, in which much research has been carried out and which is now commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Such a lithium secondary battery is manufactured by coating and drying a cathode or anode active material, a binder, and a conductive material onto a current collector in the form of a slurry to form an electrode mixture layer, thereby fabricating a cathode and an anode, and incorporating an electrode assembly with a separator interposed between the cathode and the anode in a battery case together with the electrolytic solution.

Further, the performance of the lithium secondary battery manufactured in this way is affected by the components constituting the lithium secondary battery, and among them, the electrode performance is greatly affected by the drying profile of the drying process in which the solvent is evaporated after coating the electrode active material slurry.

However, in a conventional case, such a drying profile is optimized and applied by evaluating the physical properties of the product after the drying has been completed.

Specifically, cracks, thermal wrinkles, bending cracks, and the like generate during drying of the electrode, wherein such defects are evaluated by observing the electrode surface after drying, and the line is stopped during generation of defects, the entire amount of the product is discarded, and thus, losses are very large.

Therefore, in order to prevent such losses, there is an urgent need to develop a system technology that recognize in advance the possibility of generation of defects during drying and controls the drying process in real time.

BRIEF SUMMARY OF THE INVENTION

The present disclosure has been designed to solve the above-mentioned problems, and an object of the present disclosure is to provide a system that sets a generation index of thermal wrinkles during drying, measure the electrode temperature for its calculation, and recognizes the possibility of generation of thermal wrinkles in real time, thereby controlling the drying process.

Another object of the present disclosure is to provide a system in which the drying process can be automated and unmanned without extensively reconstructing an existing facility, and the generation of defects in the electrodes for secondary batteries manufactured thereby can be dramatically reduced and thus, losses resulting therefrom can be prevented.

According to one embodiment of the present disclosure, there is provided an automated system for drying conditions of electrodes for secondary battery, the system comprising:
  a transfer unit that transfers a preliminary electrode in which an electrode active material slurry is coated onto a current collector,
  one or more drying units that are arranged along the transfer direction and dry the preliminary electrode,
  one or more sensors that measure the electrode temperature of the preliminary electrode in real time and transmit information to a system control unit, and
  a system control unit that receives information from the sensors and adjusts the drying conditions,
  wherein the adjustment of the drying conditions is to change the conditions when the information received from the sensors satisfies the following condition 1 or 2:

$$\Delta T = T2 - T1 = T3 - T1 \qquad \text{[Condition 1]}$$

wherein, T1 is the electrode temperature when there is no change in the electrode temperature of the preliminary electrode while the solvent evaporation of the electrode active material slurry is being performed, T2 is the electrode temperature of the preliminary electrode to be dried, and T3 is a value input in advance for the temperature at which thermal wrinkles start to generate according to the composition of the electrode active material slurry to be applied, $$\alpha\left(\frac{dT}{dt}\right) > 0, \text{ and } \beta\left(\frac{d}{dt}\left(\frac{dT}{dt}\right)\right) = 0.5 \qquad \text{[Condition 2]}$$

wherein, $\alpha$ is the electrode temperature increase rate of the preliminary electrode, and $\beta$ is the electrode temperature increase acceleration of the preliminary electrode.

At this time, the one or more sensors and the one or more drying units may be installed within the same drying oven.

Further, the one or more sensors may be alternately arranged with one or more drying units.

Meanwhile, all information collected by the one or more sensors is transmitted to the system control unit, and the system control unit may collect the transmitted information and determine the conditions.

At this time, the electrode active material slurry information, the T3 value obtained in advance for the electrode active material slurry, the conditions 1 and 2, and the drying process conditions are input to the system control unit before starting the drying of the preliminary electrode, and the system control unit may change the drying condition when the information received from the sensors satisfies the condition 1 or 2.

More specifically, the system control unit graphs the electrode temperature of the preliminary electrode, the electrode temperature increase rate, and the electrode temperature increase acceleration from the information received from the sensor, and may change the drying conditions when the value obtained from the graph satisfies the condition 1 or 2.

When the condition 1 or 2 is satisfied, the system control unit lowers the drying temperature, increases the transfer speed of the transfer unit, or does not proceed with drying anymore.

Particularly, the change of the drying conditions is made when the condition 2 is satisfied.

Meanwhile, the one or more drying units may be either a hot air unit that generates hot air, or a heating unit that directly applies heat, and the one or more sensors may be IR sensors.

DETAILED DESCRIPTION OF THE EMBODIMENTS

Hereinafter, the electrode manufacturing apparatus of the present disclosure will be described in detail with reference to the accompanying figures so that those skilled in the art can easily implement the invention. However, the following figures are for illustrative purposes only, and the invention may be modified in various different ways within the scope of the present disclosure, and is not limited to the figures.

According to one embodiment of the present disclosure, there is provided an automated system for drying conditions of electrodes for secondary battery, the system comprising:
a transfer unit that transfers a preliminary electrode in which an electrode active material slurry is coated onto a current collector,
one or more drying units that are arranged along the transfer direction and dry the preliminary electrode,
one or more sensors that measure the electrode temperature of the preliminary electrode in real time and transmit information to a system control unit, and
a system control unit that receives information from the sensors and adjusts the drying conditions,
wherein the adjustment of the drying conditions is to change the conditions when the information received from the sensors satisfies the following condition 1 or 2:

$$\Delta T = T2 - T1 = T3 - T1 \qquad \text{[Condition 1]}$$

wherein, T1 is the electrode temperature when there is no change in the electrode temperature of the preliminary electrode while the solvent evaporation of the electrode active material slurry is being performed, T2 is the electrode temperature of the preliminary electrode to be dried, and T3 is a value input in advance for the temperature at which thermal wrinkles start to generate according to the composition of the electrode active material slurry to be applied, $$\alpha\left(\frac{dT}{dt}\right) > 0, \text{ and } \beta\left(\frac{d}{dt}\left(\frac{dT}{dt}\right)\right) = 0.5 \qquad \text{[Condition 2]}$$

wherein, $\alpha$ is the electrode temperature increase rate of the preliminary electrode, and $\beta$ is the electrode temperature increase acceleration of the preliminary electrode.

The electrode temperature is the electrode surface temperature measured by the sensor.

That is, according to the present disclosure, during the drying process of the electrode, the sensor measures the electrode temperature of the preliminary electrode in real time, transmits it to a system control unit, and when the above specific conditions are satisfied, the system control unit adjusts the drying conditions, thereby preventing generation of wrinkles in the electrode current collector and reducing the defect rate.

At this time, the specific condition for adjusting the drying condition is the case of satisfying the condition 1 or condition 2 as described above.

First, when examining the above condition 1, the conditions for generating thermal wrinkles in the current collector may be changed depending on the electrode active material slurry, whereby there is a need for a standard that can be a measure of the generation of thermal wrinkles according to the composition of the slurry of the electrode active material.

Therefore, the temperature (T3) at which thermal wrinkles start to generate according to each composition of the electrode active material slurry can be input to the system control unit, whereby in the case of inputting once, based on this in a subsequent process, the electrode temperature of the preliminary electrode is measured in real time, and when the condition 1 is satisfied, the adjustment of the drying condition can be performed automatically.

At this time, the T1 is the electrode temperature when there is no change in the electrode temperature of the preliminary electrode, and specifically, the electrode temperature when there is no change in the electrode temperature for 1 second or more. This means the electrode temperature in the flat section in the electrode temperature graph described later.

Further, the present inventors have conducted intensive studies on the condition 2, measured the electrode temperature of the preliminary electrode in real time irrespective of the composition of the electrode active material slurry, and confirmed from these measured values that when the electrode temperature increase rate of the preliminary electrode and the electrode temperature increase acceleration of the preliminary electrode satisfy the above ranges, thermal wrinkles are generated in the current collector when the condition 2 is satisfied Therefore, according to the present disclosure, when the value of the condition 1 and/or the value of the condition 2 is input to the system control unit, the drying condition can be automatically adjusted only by measuring the electrode temperature of the preliminary electrode in a subsequent electrode drying process, so that unmanned operation is possible, and the generation rate of thermal wrinkles of the electrode can be dramatically reduced, which is thus economical.

Figure 1:
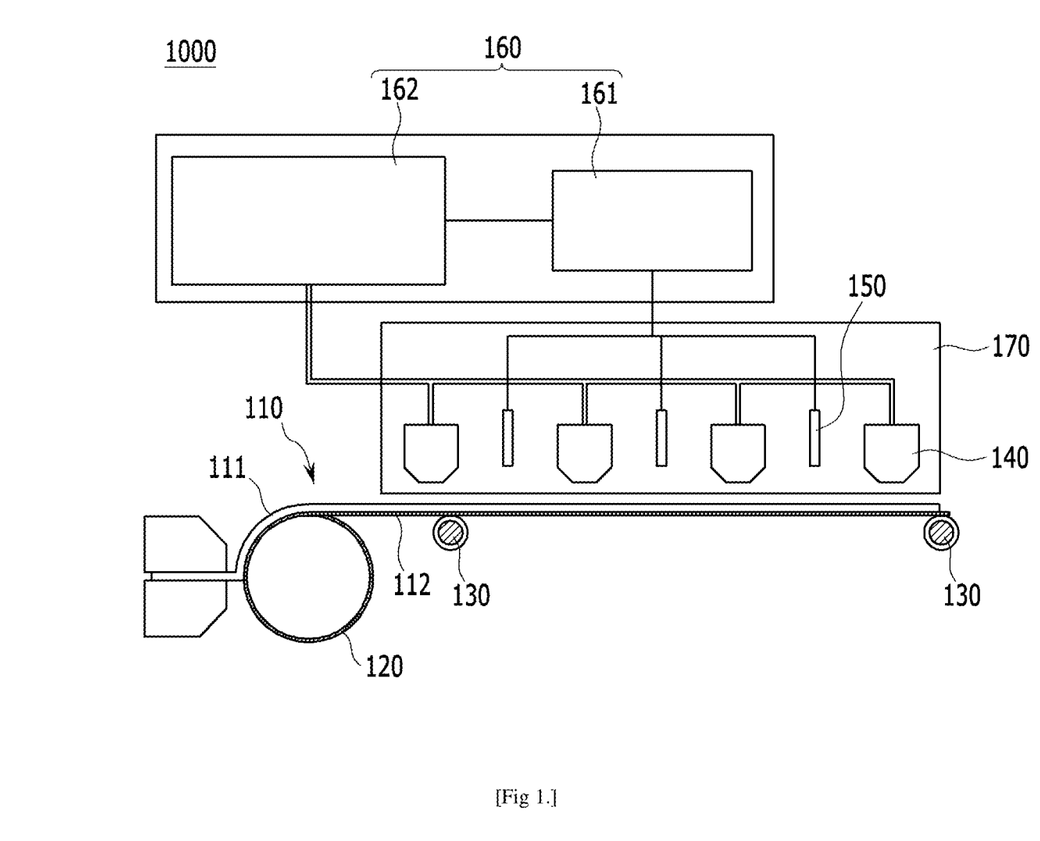
FIG. 1 is a schematic diagram of an automated system for electrode drying process according to an embodiment of the present disclosure.

The schematic diagram of an automated system for electrode drying process according to an embodiment of the present disclosure is shown in FIG. 1.

Referring to FIG. 1, an automated system 1000 for drying conditions of electrodes for secondary battery according to the present disclosure includes a transfer unit 130 that transfers a preliminary electrode 110 in which an electrode active material slurry 111 is coated onto a current collector 112, one or more drying units 140 that are arranged along the transfer direction and dry the preliminary electrode 110, one or more sensors 150 that measure the electrode temperature of the preliminary electrode 110 in real time and transmit information to a system control unit 160, and a system control unit 160 that receives information from the sensors 150 and adjusts the drying conditions.

Specifically, the preliminary electrode 110 may have a structure in which an electrode active material slurry 111 containing an electrode active material, a conductive material, a binder, and optionally other additives is coated onto the current collector 112, and the electrode active material slurry 111 is in a form containing a solvent before drying.

The electrode active material may be appropriately selected depending on whether the preliminary electrode is a cathode or an anode. Specific examples of such an electrode active material are known in the art, and any kind of active materials can be selected, and thus, a detailed description thereof will be omitted herein.

Specific examples of the binder and the conductive material are known in the art, similarly to the electrode active material, and any kind of active materials can be selected, and thus, a detailed description thereof will be omitted herein.

On the other hand, the current collector can also be selected depending on whether the preliminary electrode is a cathode or an anode. For example, a metal sheet such as aluminum or copper, a mesh, a film, a foil, and the like can be used, and specific examples thereof are known in the art, and thus, a detailed description will be omitted herein.

The preliminary electrode 110 is transferred to the drying unit 140 for a drying process for evaporating the solvent, and such a transfer is performed by the transfer unit 130.

The transfer unit 130 is not limited, but may be, for example, a transfer roll.

Meanwhile, the preliminary electrode 110 is transferred to the drying unit 140 by the transfer unit 130. At this time, the drying units 140 are arranged in four numbers along the transport direction, and perform the role of drying the preliminary electrode 110 while the preliminary electrode 110 is being transferred by the transfer unit 130.

The number of drying units 140 is only one example, and the number is not limited as long as it is one or more, and it is preferable that it is two or more.

Further, when there are a plurality of drying units 140, the drying units 140 may be installed within the same drying oven 170.

Here, the drying unit 130 is not limited as long as it has a form capable of drying the preliminary electrode 110, but may be, for example, a hot air unit that generates hot air or a heating unit that directly applies heat.

The drying time by the drying unit 140 is affected by the transfer speed of the transfer unit 130, and drying conditions such as the drying temperature and the transfer speed of the transfer unit 130 are adjusted by the system control unit 160 described later.

Meanwhile, in order to measure the electrode temperature of the preliminary electrode 110 in real time while the preliminary electrode 110 is dried, the automated system 1000 for drying conditions of electrodes according to the present disclosure includes sensors 150 that measure the electrode temperature of the preliminary electrode 110 in real time and transmit information to the system control unit 160.

At this time, the three sensors 150 are alternately arranged in a form positioned between the drying units 140.

That is, the sensors 150 are preferably located at various places in the drying process to measure the electrode temperature of the transferred preliminary electrode 110 in real time, and thus may be arranged in the transfer direction of the preliminary electrode 110.

Therefore, the sensor 150 may also be installed in the same drying oven 170 as the drying unit 140.

The sensor 150 is not limited as long as it has a structure capable of measuring the electrode temperature of the preliminary electrode 110, and may be, for example, a non-contact thermal sensor, specifically, an IR sensor.

Meanwhile, the information collected by the sensor 150 is transmitted to the mode system control unit 160, and the system control unit 160 analyzes, calculates, and evaluates the transmitted information, determines whether or not the conditions are satisfied, and then determines whether to adjust the drying conditions, the direction, and the like.

Specifically, the information collected by the sensor is transmitted to an information collection unit 161, and when the analysis of such information is completed, the drying condition adjustment unit 162 adjusts the drying conditions in accordance with the analysis.

That is, the system control unit 160 instead performs the role of the operator, and enables the automated system for adjusting the drying conditions.

Figure 2:
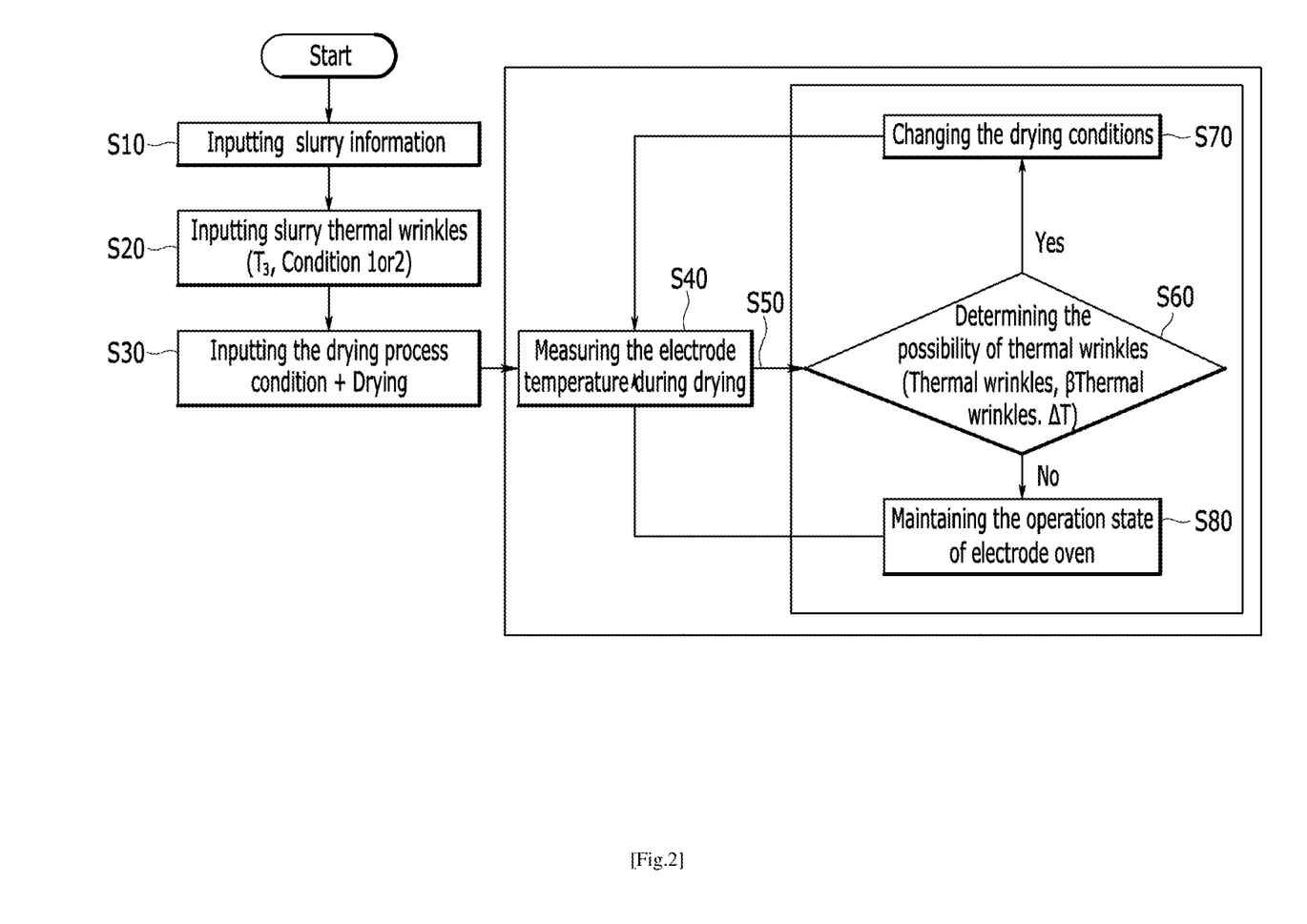
FIG. 2 is a flowchart of an automated system for electrode drying process according to an embodiment of the present disclosure.

In order to explain the role of these system control units in more detail, a flowchart of an automated system for adjusting electrode drying conditions of the present disclosure is schematically shown in FIG. 2.

Referring to FIG. 2 together with FIG. 1, first, information of the electrode active material slurry 111 is input to the system control unit 160 before starting the drying of the preliminary electrode 110 (S10), the previously obtained T3 value and the conditions 1 and 2 for the electrode active material slurry 111 (S20) are input, and then the drying process conditions are input to perform electrode drying of the preliminary electrode 110 (S30).

During the electrode drying process of the preliminary electrode 110, one or more sensors 150 measure the electrode temperature in real time (S40), and all information collected therefrom is transmitted to the system control unit 160 (S50).

Then, the system control unit 160 collects the transmitted information and determines whether or not the conditions 1 and 2 are satisfied (S60). If any one or more of the conditions 1 and 2 is satisfied, the electrode drying process condition is changed (S70), and if not so, the operation state of the electrode drying oven 170 is maintained (S80).

Specifically, the system control unit 160 graphs the electrode temperature of the preliminary electrode 110, the electrode temperature increase rate, and the electrode temperature increase acceleration from the information received from the sensors 150, and when the value obtained from the graph satisfies the above conditions 1 or 2, the drying conditions may be changed.

Here, in order to change the drying conditions, when the conditions 1 or 2 are satisfied, the system controller 160 may lower the drying temperature, increase the transfer speed of the transfer unit, or stop the drying.

In particular, the change of the drying condition can be performed when the condition 2 is satisfied.

Hereinafter, based on the Experimental Examples according to the present disclosure, the method for determining conditions 1 and 2 according to the automated system for drying conditions of electrodes according to the present disclosure, and the effect of preventing thermal wrinkles when the adjustment of the drying conditions is automatically performed will be described in detail, so that those of ordinary skill in the art can easily understand them.

Experimental Example 1

Preparation of Preliminary Electrodes

Figure 3:
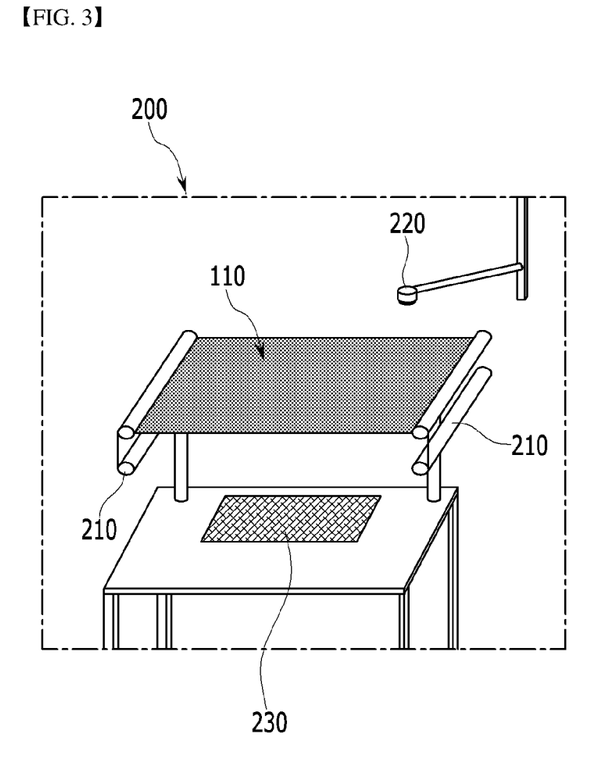
FIG. 3 is a photograph of a thermal wrinkle evaluation mechanism in a drying oven according to Experimental Example 1 of the present disclosure.

Graphite as an electrode active material, carbon black as a conductive material, and carboxy methyl cellulose (CMC) and styrene-butadiene rubber (SBR) as a binder were used, respectively, and the mixture of electrode active material: conductive material:CMC:SBR in a weight ratio of 96:1:1:2 was added to water as a solvent to prepare a composition for forming an electrode (solid content: 47%), which was then coated (200 μm) onto a copper foil (thickness: 8-12 μm) to fabricate a preliminary electrode 110.
Determination of Thermal Wrinkles According to Drying Time and Temperature The preliminary electrode 110 was interposed between the tension adjustment rods 210 of FIG. 3 and installed in a drying oven. Within the oven, the IR sensor 220 was installed at the upper part where the spare electrode 110 was mounted. In order to determine the thermal wrinkles that generate in the aluminum foil, a mirror 230 was installed at a lower part where the preliminary electrode 110 was mounted. From the image of the aluminum foil reflected on the mirror 230, it can be determined whether or not thermal wrinkles have generated.

Figure 4:
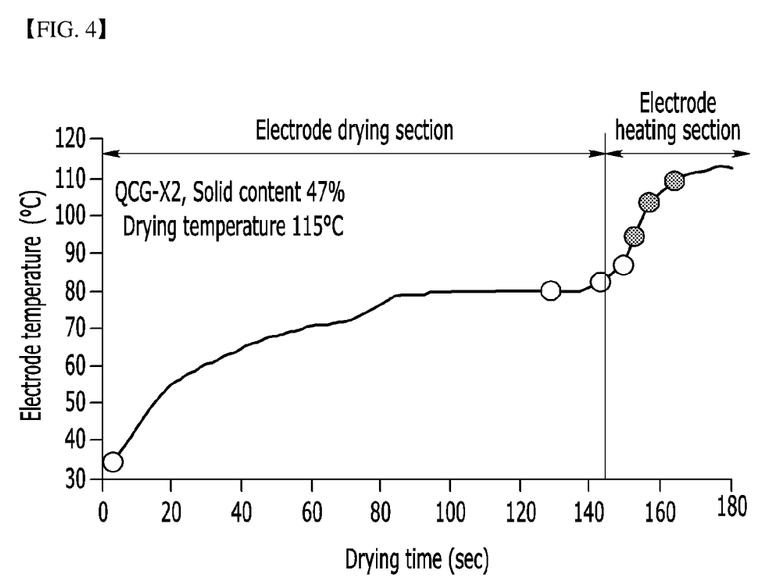
FIG. 4 is a graph of measurement of the electrode temperature according to the time at which the electrode according to Experimental Example 1 is dried.
Figure 5:
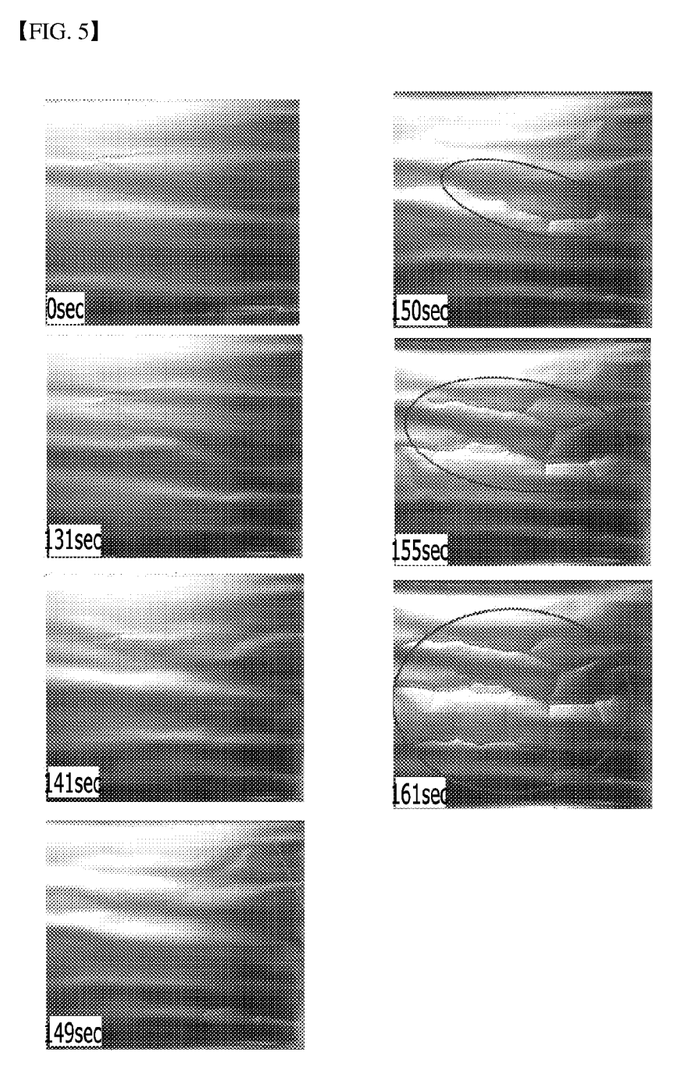
FIG. 5 is a photograph of the electrode according to the time at which the electrode according to Experimental Example 1 is dried.

From such a device, the drying temperature of the oven was set to 115° C. and 1° C./sec, a graph according to the drying time and electrode temperature while conducting the drying was obtained from the IR sensor 220, an image of the aluminum foil obtained from the mirror 230 was taken and the results are shown in FIGS. 4 and 5. From the result of FIG. 4, the electrode temperature in the section of the drying time between 100 seconds and 180 seconds, 115° C. and 1° C./sec were set and dried, and the results obtained were shown in FIG. 6.

Referring to FIGS. 4 and 5, the electrode temperature of the preliminary electrode gradually increases similarly to the temperature increase rate according to the drying time. However, at a certain moment, despite the temperature increase of the oven at about 80° C. on the graph, the electrode temperature indicates a flat section. It can be seen that the temperature increase is not made while the solvent evaporation of the electrode active material slurry is made at the above temperature, and that the deformation of the aluminum foil begins to appear due to the drying stress after 131 seconds, which is the end of the flat section. After 141 seconds have passed, the drying is completed, and again, the electrode temperature rapidly increases according to the temperature of the oven. At this time, it can be seen that the aluminum foil is thermally expanded and thermal wrinkles appear with the passage of 150 seconds.

From these experiments, in the case of the composition of the electrode active material slurry, the value of the condition 1 can be set.

Specifically, in the case of the electrode active material slurry composition, T3 is 95° C., and T1 is 80° C. when there is no change in electrode temperature, so the t value is determined as 5° C.

Therefore, when drying the electrode active material slurry having the above composition, when $\Delta T = T2 - T1$ reaches 15° C., the system control unit changes the drying conditions.

As an example, one electrode active material slurry is disclosed, but this method can obtain a t value by the same method even for the electrode active material slurries having various compositions. Then, when drying the electrode active material slurry having the same composition, the drying conditions can be automatically changed only by measuring the electrode temperature value when the above condition 1 is satisfied.

Meanwhile, the present inventors confirmed that the value of the condition 1 is different for each electrode active material slurry, the drying conditions change at the same time as the start of generation of thermal wrinkles, so that the drying conditions cannot be changed as a preventive measure. Thus, as the above experiment is applied to various electrode active material slurries, more standard indicators for the generation of thermal wrinkles can be obtained from graphs of the electrode temperature increase rate ($\alpha$) and the electrode temperature increase acceleration rate ($\beta$) rather than the electrode temperature.

Figure 6:
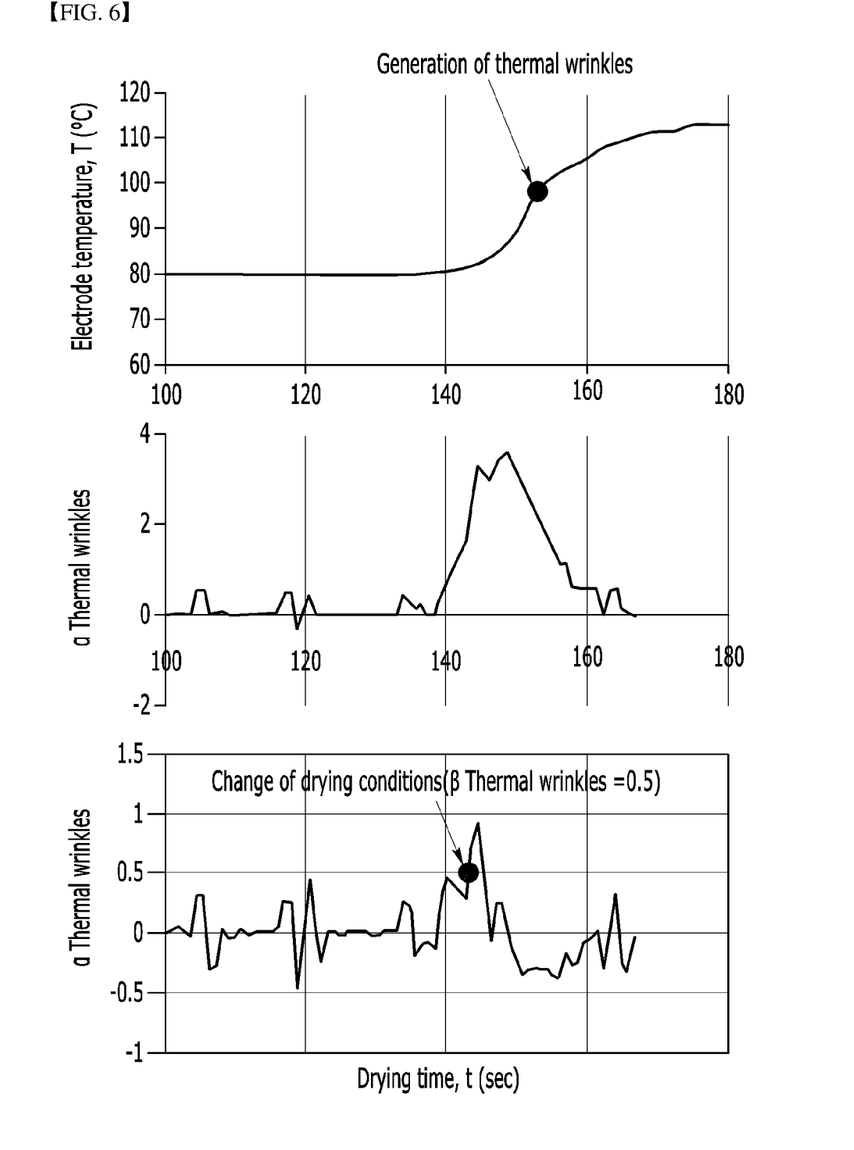
FIG. 6 is a graph of measuring the electrode temperature within 100 seconds to 180 seconds in the drying process, the electrode temperature increase rate, and the electrode temperature increase acceleration according to Experimental Example 1.

Specifically, referring to FIG. 6, based on the graph of FIG. 4, the electrode temperature increase rate ($\alpha$) and the electrode temperature increase acceleration ($\beta$) graphs are obtained along with the electrode temperature at the drying time between 100 seconds and 180 seconds.

It can be seen that the point where thermal wrinkles generate in the electrode temperature graph is about 150° C., whereas it is confirmed that the point where $$\alpha\left(\frac{dT}{dt}\right) > 0, \text{ and } \beta\left(\frac{d}{dt}\left(\frac{dT}{dt}\right)\right) = 0.5$$

appears before generation of thermal wrinkesg (before 150° C.) while the solvent evaporation is completely performed and the drying is completed (after 141° C.). It can be seen that when the drying conditions are changed when satisfying the above conditions, more preferably, generation of thermal wrinkles is prevented, electrode defects are suppressed, and the productivity is significantly improved, and at the same time, the drying process of the preliminary electrode can be automated and unmanned.

Therefore, according to the present disclosure, it is more preferable to change the drying conditions when satisfying the above condition 2.

In addition, it is confirmed that these conditions are not affected by the composition of the electrode active material slurry, and the drying conditions of the preliminary electrode can be adjusted before thermal wrinkles are generated.

Experimental Example 2

Figure 7:
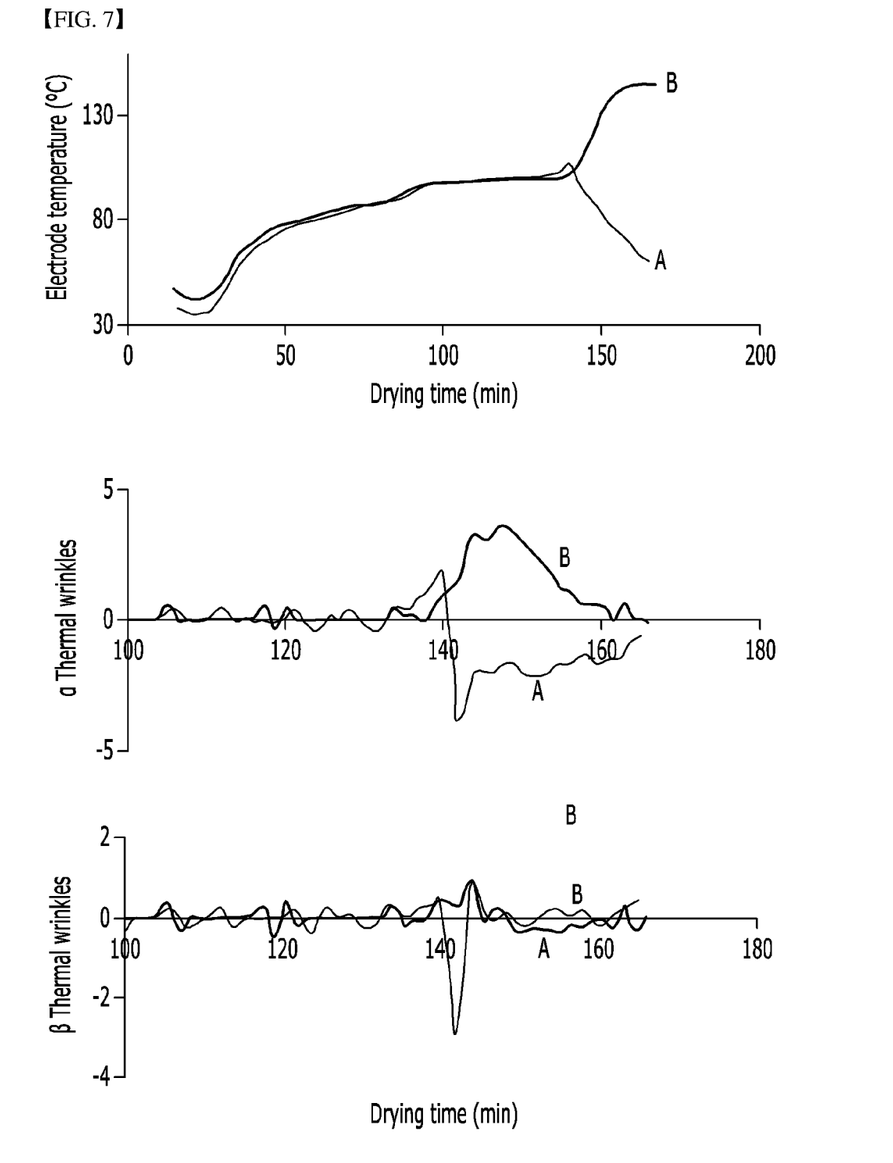
FIG. 7 is a comparative graph in which an electrode temperature, an electrode temperature increase rate, and an electrode temperature increase acceleration are measured during electrode drying according to Experimental Example 2.

Based on the information obtained from the sensors while drying the preliminary electrode produced in Experimental Example 1 in an oven set at 115° C. and 1° C./sec, a comparative graph of the electrode temperature, the electrode temperature increase rate ($\alpha$), and the electrode temperature increase acceleration ($\beta$) obtained for the electrode A in which the power of the oven is turned off so as not to proceed with drying when satisfying the condition 1 or 2, and the electrode B in which the drying condition is maintained without performing such condition setting are shown in FIG. 7. After the drying is completed (165 seconds), a photograph of the aluminum foil surface is taken and shown in FIG. 8.

Referring to FIG. 7, it can be seen that in the case of electrode A whose drying conditions are changed according to the present disclosure, the electrode temperature increase rate ($\alpha$) is maintained below 0 while the electrode temperature is lowered 150 seconds before thermal wrinkles are generated, whereas in the case of electrode B, the electrode temperature continuously increases, and accordingly, the electrode temperature increase rate ($\alpha$) also shows an appearance exceeding 0.

Figure 8:
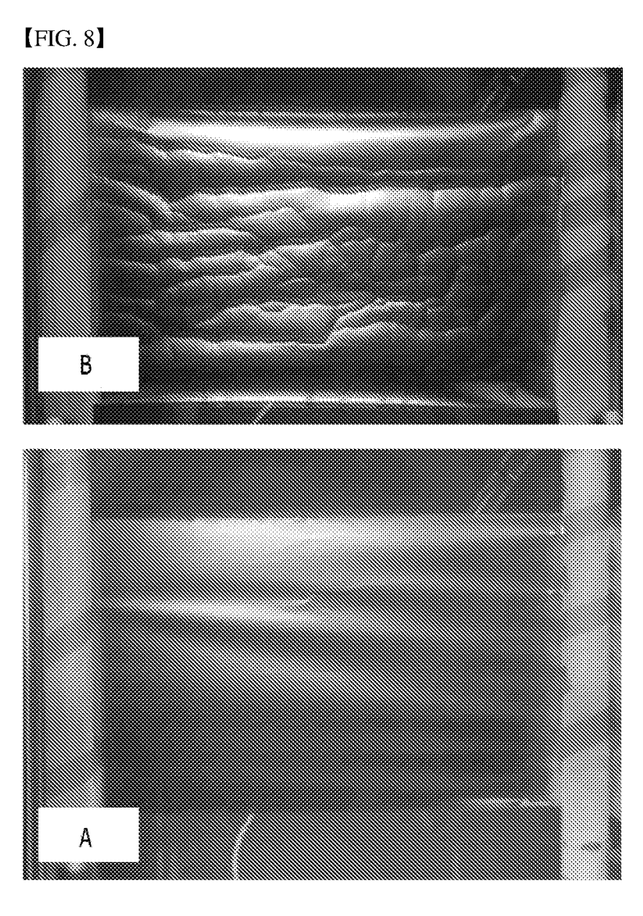
FIG. 8 is a photograph of the foil surface of the electrode after drying according to Experimental Example 2.

Additionally, referring to FIG. 8, it can be confirmed from the above results that in the case of electrode A, almost no thermal wrinkles generated, whereas in the case of electrode B, thermal wrinkles are generated as a whole.

EXPLANATION OF REFERENCE NUMERALS

1000: automated system for drying conditions
110: preliminary electrode
120: electrode roll
130: transfer unit
140: drying unit
150: sensor
160: system control unit
170: drying oven
200: thermal wrinkle evaluation mechanism
210: tension adjustment rod
220: IR sensor
230: mirror

INDUSTRIAL APPLICABILITY

According to the present disclosure, it is possible to derive a thermal wrinkle generation index according to the electrode temperature for a secondary battery, measure the electrode temperature in real time and recognize the possibility of generation of thermal wrinkles of the electrode during drying, whereby the drying process can be controlled in real time, and thus, the electrode drying process can be automated and unmanned, the generation of electrode defects is substantially eliminated and the productivity can be improved.

The invention claimed is:

1. An automated system for drying conditions of electrodes for secondary battery, the system comprising:
   a transfer unit configured to transfer a preliminary electrode in which an electrode active material slurry is coated onto a current collector,
   one or more drying units arranged along a transfer direction and configured to dry the preliminary electrode,
   one or more sensors configured to measure an electrode temperature of the preliminary electrode in real time and to transmit information to a system control unit, and
   a system control unit configured to receive information from the one or more sensors and to adjust the drying conditions,
   wherein the adjustment of the drying conditions is to change the conditions when the information received from the sensors satisfies the following condition 1 or 2:

$$\Delta T = T2 - T1 = T3 - T1 \quad \text{[Condition 1]}$$

wherein, T1 is the electrode temperature when there is no change in the electrode temperature of the preliminary electrode while the solvent evaporation of the electrode active material slurry is being performed, T2 is the electrode temperature of the preliminary electrode to be dried, and T3 is a value input in advance for the temperature at which thermal wrinkles start to generate according to the composition of the electrode active material slurry to be applied, $$\alpha\left(\frac{dT}{dt}\right) > 0, \text{ and } \beta\left(\frac{d}{dt}\left(\frac{dT}{dt}\right)\right) = 0.5 \quad \text{[Condition 2]}$$

wherein, $\alpha$ is the electrode temperature increase rate of the preliminary electrode, and $\beta$ is the electrode temperature increase acceleration of the preliminary electrode.

2. The automated system for drying conditions of electrodes for secondary battery according to claim 1, wherein: the one or more sensors and the one or more drying units are installed within the same drying oven.

3. The automated system for drying conditions of electrodes for secondary battery according to claim 1, wherein: the one or more sensors are alternately arranged with one or more drying units.

4. The automated system for drying conditions of electrodes for secondary battery according to claim 1, wherein: all information collected by the one or more sensors is configured to be transmitted to the system control unit, and the system control unit is configured to collect the transmitted information and to determine the conditions.

5. The automated system for drying conditions of electrodes for secondary battery according to claim 1, wherein: the electrode active material slurry information, the T3 value obtained in advance for the electrode active material slurry, the conditions 1 and 2, and the drying process conditions are input to the system control unit before starting the drying of the preliminary electrode, and the system control unit is configured to change the drying condition when the information received from the sensors satisfies the condition 1 or 2.

6. The automated system for drying conditions of electrodes for secondary battery according to claim 1, wherein:
when the condition 1 or 2 is satisfied, the system control unit is configured to lower the drying temperature, to increase the transfer speed of the transfer unit, or is configured to not proceed with drying anymore.

7. The automated system for drying conditions of electrodes for secondary battery according to claim 1, wherein:
the system control unit is configured to graph the electrode temperature of the preliminary electrode, the electrode temperature increase rate, and the electrode temperature increase acceleration from the information received from the sensor, and to change the drying conditions when the value obtained from the graph satisfies the condition 1 or 2.

8. The automated system for drying conditions of electrodes for secondary battery according to claim 1, wherein:
the change of the drying conditions is configured to be made when the condition 2 is satisfied.

9. The automated system for drying conditions of electrodes for secondary battery according to claim 1, wherein:
the one or more drying units are either a hot air unit that generates hot air, or a heating unit that directly applies heat.

10. The automated system for drying conditions of electrodes for secondary battery according to claim 1, wherein:
the one or more sensors are IR sensors.

* * * * *